United States Patent
Bisogno

(10) Patent No.: US 9,972,998 B2
(45) Date of Patent: May 15, 2018

(54) SHORT CIRCUIT SELF-PROTECTED DC-TO-DC BUCK CONVERTERS

(71) Applicant: Dialog Semiconductor (UK) Limited, Reading (GB)

(72) Inventor: Vincenzo Bisogno, Swindon (GB)

(73) Assignee: Dialog Semiconductor (UK) Limited, Reading (GB)

( * ) Notice: Subject to any disclaimer, the term of this patent is extended or adjusted under 35 U.S.C. 154(b) by 299 days.

(21) Appl. No.: 14/732,961

(22) Filed: Jun. 8, 2015

(65) Prior Publication Data
US 2016/0359320 A1  Dec. 8, 2016

(51) Int. Cl.
*H02H 9/02* (2006.01)
*H02M 1/32* (2007.01)
*H02M 3/156* (2006.01)

(52) U.S. Cl.
CPC .............. *H02H 9/02* (2013.01); *H02M 1/32* (2013.01); *H02M 3/156* (2013.01)

(58) Field of Classification Search
CPC ......... H02M 2001/0009; H02M 1/083; H02M 3/158
See application file for complete search history.

(56) References Cited

U.S. PATENT DOCUMENTS

| | | | |
|---|---|---|---|
| 6,031,702 A | 2/2000 | Williams | |
| 6,127,814 A | 10/2000 | Goder | |
| 2006/0017421 A1* | 1/2006 | Solie | H02J 7/022 323/225 |
| 2007/0152600 A1 | 7/2007 | Nerone | |
| 2010/0157487 A1* | 6/2010 | Wu | H02M 1/32 361/18 |
| 2010/0328831 A1* | 12/2010 | Zhang | H02M 1/32 361/93.1 |
| 2013/0176004 A1* | 7/2013 | Lai | H02M 3/1563 323/234 |
| 2015/0137776 A1* | 5/2015 | Thomas | H02M 3/1588 323/271 |
| 2016/0336857 A1* | 11/2016 | Liu | H02M 3/158 |

OTHER PUBLICATIONS

"Design of Intrinsically Safe Buck DC/DC Converters," by Shulin Liu et al., Electrical Machines and Systems, 2005. ICEMS 2005. Proceedings of the Eighth International Conference, IEEE, Sep. 29, 2005, pp. 1327-1331.

"Analysis of a Voltage Controlled Frequency Foldback Technique that Improves Short Circuit Protection for Buck Derived Converters," by Philip Cooke, Telecommunications Energy Conference, 1996. INTELEC '96., 18th International, IEEE, Oct. 6-10, 1996, pp. 749-755.

(Continued)

*Primary Examiner* — Adolf Berhane
*Assistant Examiner* — Bart Iliya
(74) *Attorney, Agent, or Firm* — Saile Ackerman LLC; Stephen B. Ackerman

(57) ABSTRACT

Buck converters with self-protection against short circuit at the buck converter outputs and intrinsic soft start-up circuitry are disclosed. The methods and circuits disclosed are applicable for PFM and PWM modulated converters. The methods disclosed are also applicable for boost converters against shorts between boosted voltage and supply voltage.

12 Claims, 16 Drawing Sheets

(56) References Cited

OTHER PUBLICATIONS

NCV890200, "2 A, 2 MHz Automotive Buck Switching Regulator," Semiconductor Components Industries, LLC, Oct. 2014, pp. 1-18, www.onsemi.com.
AIC1578, "High-Efficiency, Step-Down DC/DC Converter," Analog Integrations Corporation, Dec. 27, 2000, pp. 1-7, www.analog.com.tw.
"Low-Input High-Efficiency Synchronous Buck Controller," Texas Instruments Incorporated, TPS400007, TPS400009, Feb. 2005, 28 pgs.
MAX15046, "40V, High-Performance, Synchronous Buck Controller," maxim integrated, Jun. 2014, pp. 1-23.
BCD Data Sheet AP3503, 340kHz, 3A Synchronous DC-DC Buck Converter, BCD Semiconductor Manufacturing Limited, May 2012, pp. 1-10.
Fujitsu Semiconductor Data Sheet, DS04-27274-4E, ASSP for Power Management Applications, "4ch System Power Management IC for LCD Panel," MB39C313A, May 2011, pp. 1-51.

\* cited by examiner

SHORT CIRCUIT SELF-PROTECTED DC-TO-DC BUCK CONVERTERS

TECHNICAL FIELD

This disclosure relates generally to electronic circuits and relates specifically to novel short circuit self-protection methods and circuits for Buck Converters and also boost converters which are self-protected against short circuits.

BACKGROUND

There is a growing demand for switching Buck Converters. A very important feature of buck converters is the capability to withstand an Output Short Circuit.

Currently most of the commercial or known solutions to protect a Buck from a damage of a short circuit rely on as follows:

External components;
Cycle to cycle current limit;
Frequency Foldback Technique;
Hiccup Mode;

It is obvious that the use of external components is expensive and it doesn't contribute to robustness of the converter itself.

The Cycle to Cycle current limit and the Frequency Foldback Technique, as outlined later, need a complex design effort and, if not carefully designed, does not always guarantee a reliable short circuit protection.

Moreover in the above protections the control loop must be carefully checked to avoid instability issues.

The Hiccup Mode instead creates a huge in-rush of current every cycle and for this reason it can create problems at the system level.

All those methods rely on the designer's ability to identify the worst case condition and define the trade-off between frequency, stability, duty-cycle, minimum turn-off time, minimum turn-on time, inductor and capacitance parameters.

It is a challenge to designers of buck converters or boost converters to overcome the disadvantages mentioned above.

SUMMARY

A principal object of the present disclosure is to achieve a self-protection against a short circuit applied to a buck converter output or a boost converter output as well as it is an intrinsic soft start-up circuitry A further object of the present disclosure is to achieve a simple realization of self-protection against a short circuit applied to a buck converter output or a boost converter output.

A further object of the present disclosure is to achieve a simple realization of self-protection against a short circuit applied to a buck converter output or a boost converter output.

A further object of the present disclosure is to achieve self-protection against a short circuit applied to a buck converter output or a boost converter output independent from frequency, minimum Turn On time, minimum Turn Off time, Duty Cycle, Inductor and Capacitance parameters.

A further object of the present disclosure is to achieve robust and stable self-protection against a short circuit applied to a buck converter output or a boost converter output.

Furthermore an object of the present disclosure is to achieve a self-protection against a short circuit applied to a buck converter output or a boost converter output which can be applied to basically all modulations loop including CCM PFM.

Moreover an object of the present disclosure is to achieve a robust and stable self-protection against a short circuit applied to a buck converter output or a boost converter output which doesn't create in-rush current issues.

In accordance with the objects of this disclosure a buck converter enabled for self-protection of a buck converter against short circuit at the output of the buck converter and for an intrinsic soft start-up preventing excessive in-rush currents has been achieved. The buck converter disclosed firstly comprises: an output stage comprising a high side switch and a low side switch both connected in series, wherein the output stage is capable of being connected to a coil having a first terminal at a node between the high side switch and the low side switch, a minTon unit defining a minimum on-time of the high switch, and a minToff time unit configured to limiting a maximum switching frequency of the buck converter. Furthermore the buck converter comprises a circuitry configured to detecting a short circuit or an overload condition of the buck converter wherein the overload condition includes reaching a current limit of a current through the coil, a current coil low crossing detector capable of detecting when the current through the coil reaches a defined low crossing value which may be zero and issuing a corresponding signal, and a control logic configured to performing a self-protection loop by enabling and managing a recovery from a short or overload condition of the buck converter.

In accordance with the objects of this disclosure a method for self-protection of a buck converter against short circuit at the output of the buck converter and for an intrinsic soft start-up preventing excessive in-rush currents has been achieved. The method disclosed comprises the steps of: (1) providing a buck converter comprising a coil and an output stage comprising a high side switch and a low side switch, (2) checking if there is a short or an overload condition at the output of the buck converter by a correspondent circuitry and, if it so, go to step (3), else repeat step (2), and (3) ensuring the output stage stays in Tri-state once the coil current reaches zero until an internal control directs the current to flow in a same direction of the current limit that has been previously triggered and recovering normal operation of the buck converter and go back to step (2).

BRIEF DESCRIPTION OF THE DRAWINGS

In the accompanying drawings forming a material part of this description, there is shown:

FIG. 10b illustrates the waveforms of FIG. 10a zoomed in.

DETAILED DESCRIPTION

This disclosure is about a novel self-protection method and circuit against short circuit for Buck and Boost Converters and its Implementation in particular in two of the most common modulations: Pulse Frequency Modulation (PFM) and Pulse Width Modulation (PWM).

Disclosed are embodiments of methods and circuits to achieve a self-protection against short circuit applied to a buck converter output or a boost converter output as well including an intrinsic soft start-up circuitry wherein the converter operate using different modulation loops such as CCM PFM or PWM.

Discontinuos Conduction Mode (DCM) and PFM Functional Description

Figure 1:
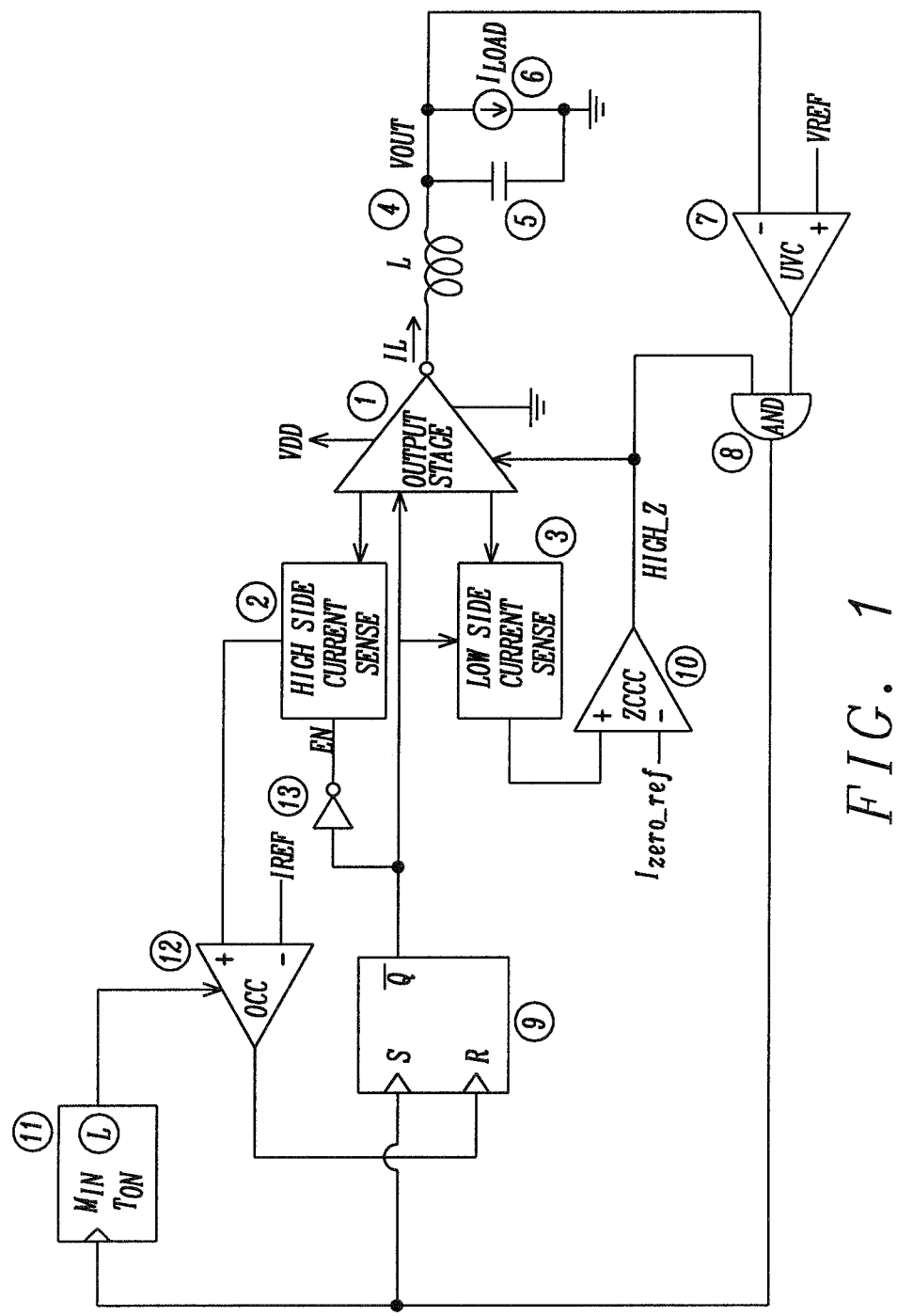
FIG. 1 shows a block diagram of a buck converter using DCM and PFM operational mode, which is protected against short circuit.
Figure 2:
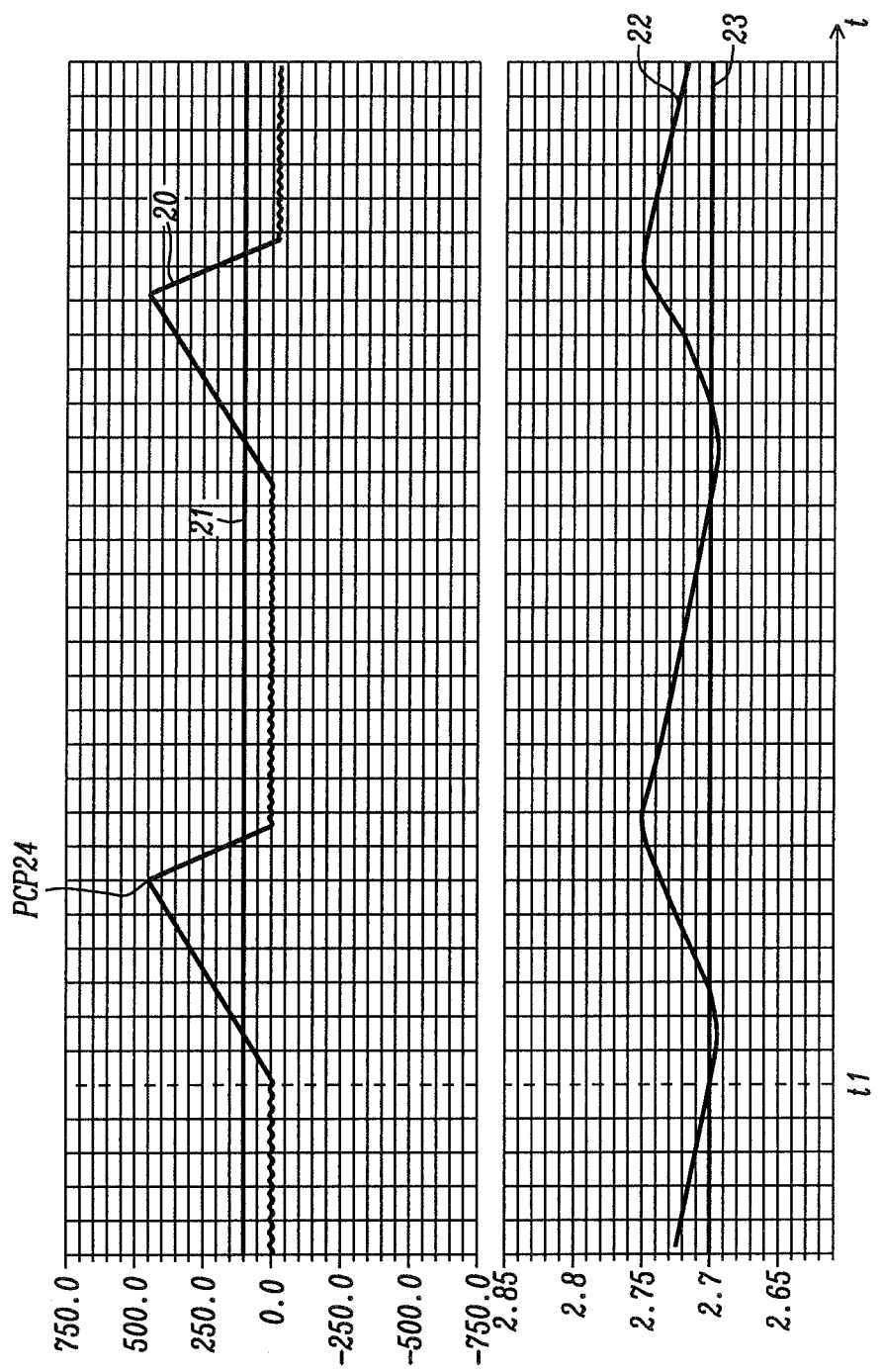
FIG. 2 shows a time diagram of the output voltage $V_{OUT}$, the reference voltage $V_{REF}$, the coil current $I_L$, and the load current $I_{LOAD}$ of the buck converter of FIG. 1.

FIG. 1 shows a block diagram of a buck converter with protection against short circuit known to the inventor, using DCM and PFM operational mode. FIG. 2 shows a time diagram of the output voltage $V_{OUT}$, the reference voltage $V_{REF}$ 23, the coil current $I_L$, and the load current $I_{LOAD}$. The currents and voltages shown in FIG. 2 correspond to the buck converter shown in FIG. 1. FIG. 2 shows the coil current $I_L$ 20, load current $I_{LOAD}$ 21, a programmed current peak PCP 24 of the coil current $I_L$, the output voltage $V_{OUT}$ 22 and the reference voltage $V_{REF}$ 23.

As shown in FIG. 1 and in FIG. 2, starting from a high impedance (Hi-Z) condition of the output stage at point of time $t_1$, when the output voltage $V_{OUT}$ goes below the reference voltage $V_{REF}$ the Under Voltage Comparator UVC 7 trips and the flip-flop 9 is Set. As a consequence the high-side in the Output Stage 1 is enabled, so the High Side Current Sense HCS 2 and the Over Current Comparator OCC 12 that is blanked for a minimum Turn On Time (minTon) 11. During this phase the high side current (that is also the current $I_L$ in the coil 4) is sensed by HCS 2 and converted in an internal amplified replica that is compared to an internal reference (IREF) function of the programmed current peak PCP 24, as shown in FIG. 2. The High Side Current Sense HCS 2 comprises the internal amplified replica. Once the current in the coil reaches the programmed current peak PCP 24 the OCC 12 trips and resets the flip-flop 9. From this point the output low side is enabled as well as the Low Side Current Sense (LSCS) 3 and the Zero Crossing Current Comparator (ZCCC) 10. The current in the coil will decrease and once it reaches zero the ZCCC 10 will trip bringing the output stage in High Impedance (High-Z) mode. Because of the logic block AND 8 only at this point, if VOUT is still below, the reference voltage VREF the loop can restart.

The blocks 13 and 5 are respectively a general logic inverter gate and a Buck Output Capacitance.

Continuous Conduction Mode (CCM) PFM Functional Description

Figure 3:
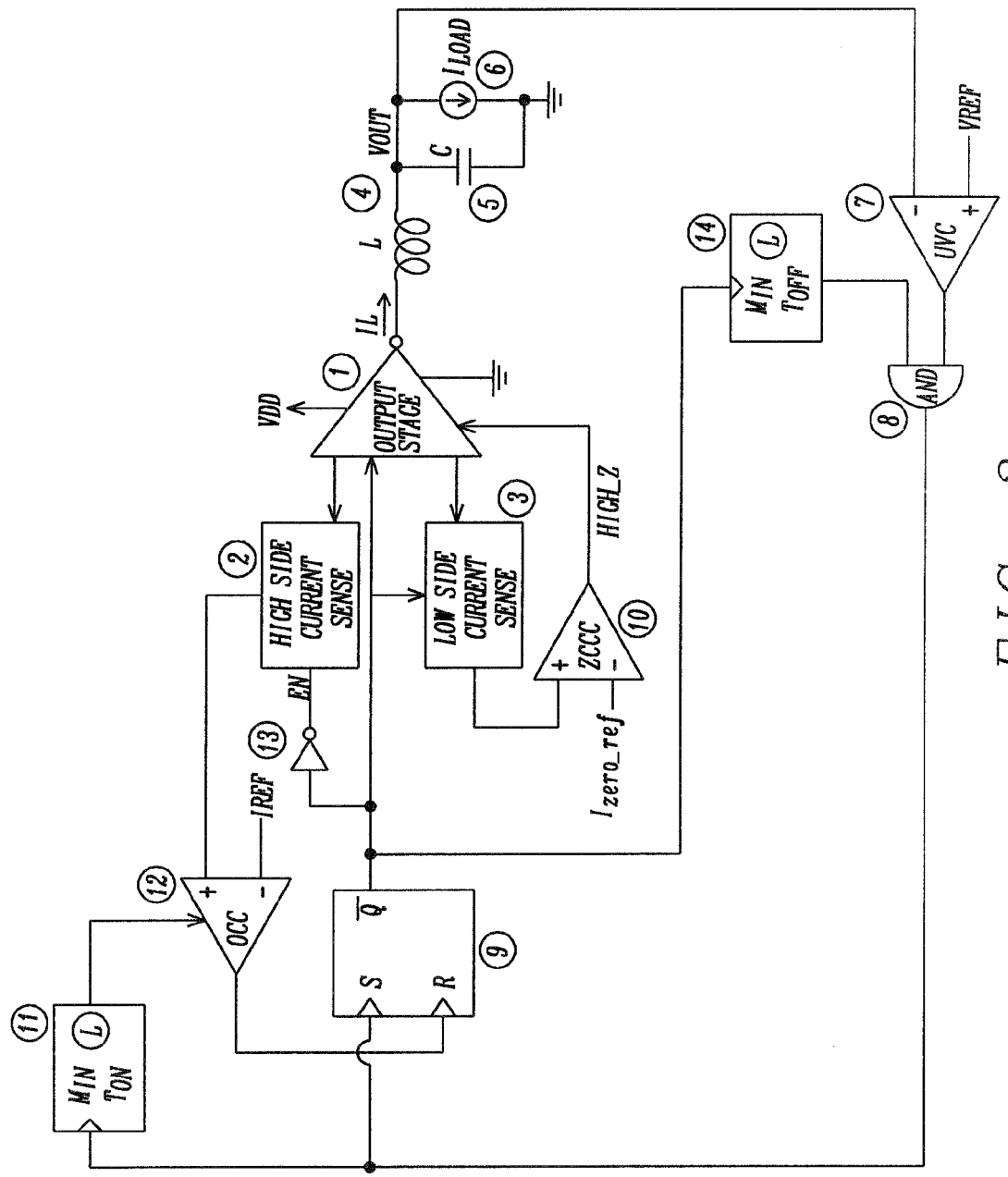
FIG. 3 shows a block diagram of a buck converter without protection against short circuit known to the inventor, using CCM and PFM operational mode.
Figure 4:
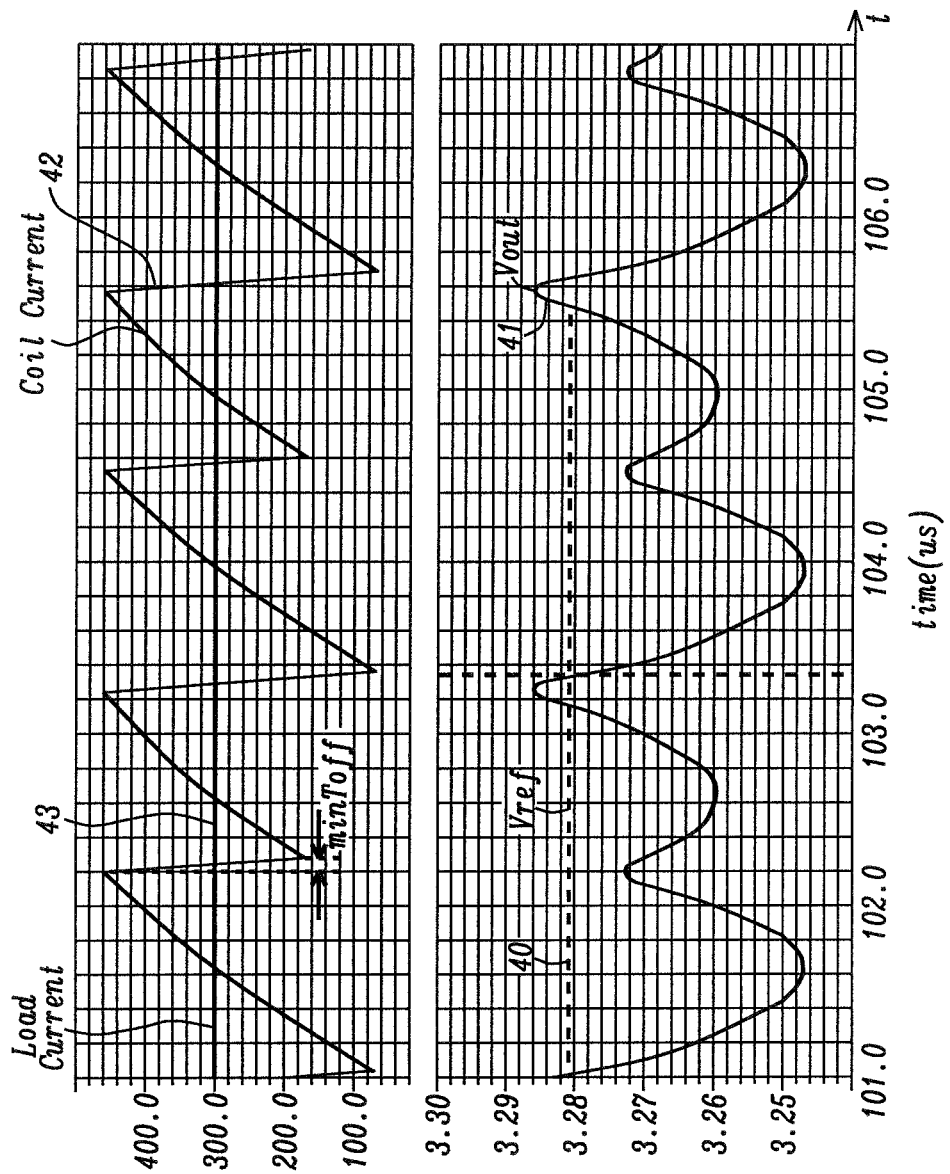
FIG. 4 shows a time diagram of the output voltage $V_{OUT}$, the reference voltage $V_{REF}$, the coil current $I_L$, and the load current $I_{LOAD}$ of the buck converter of FIG. 3.

FIG. 3 shows a block diagram of a buck converter without protection against short circuit known to the inventor, using CCM and PFM operational mode. FIG. 4 shows a time diagram of the output voltage $V_{OUT}$, the reference voltage $V_{REF}$, the coil current $I_L$, and the load current $I_{LOAD}$ of the buck converter of FIG. 3. As shown in FIG. 4, starting from a condition of output stage in Hi-Z when the VOUT 41 goes below the reference voltage VREF 40 the Under Voltage Comparator (UVC) 7 trips and the flip-flop 9 is Set. As a consequence the high-side in the Output Stage 1 is enabled, so the high side current sense (HSCS) 2 and the OCC 12 that is blanked for a minimum Turn On Time (minTon) 11. During this phase the current in the high side (that is also the current in the coil 4) is sensed and converted in an internal amplified replica that is compared to an internal reference IREF_MAX function of the programmed current peak. Once the current in the coil reaches the programmed current peak the OCC 12 trips and resets the flip-flop 9. From this point the output low side 1 is enabled as well as the Low Side Current Sense (LSCS) 3 and the ZCCC 10. The current in the coil will decrease and this time (on the contrary of the DCM PFM) after a minimum Toff time, indicated by block 14, if VOUT voltage is still below the refence voltage VREF (since the AND gate 9 is no longer gated from the minToff time) the loop can restart. In any case if the current in the coil will reach zero the ZCCC 10 will trip bringing the output stage 1 to High-Z (High Impedance).

Furthermore the circuit of FIG. 3 comprises an Inverter gate 13 and the Buck Output Capacitance 5.

Pulse Width Modulation (PWM) Functional Description

The PWM (Pulse Width Modulation) is the most common modulation used by DC-DC converters.

Figure 5:
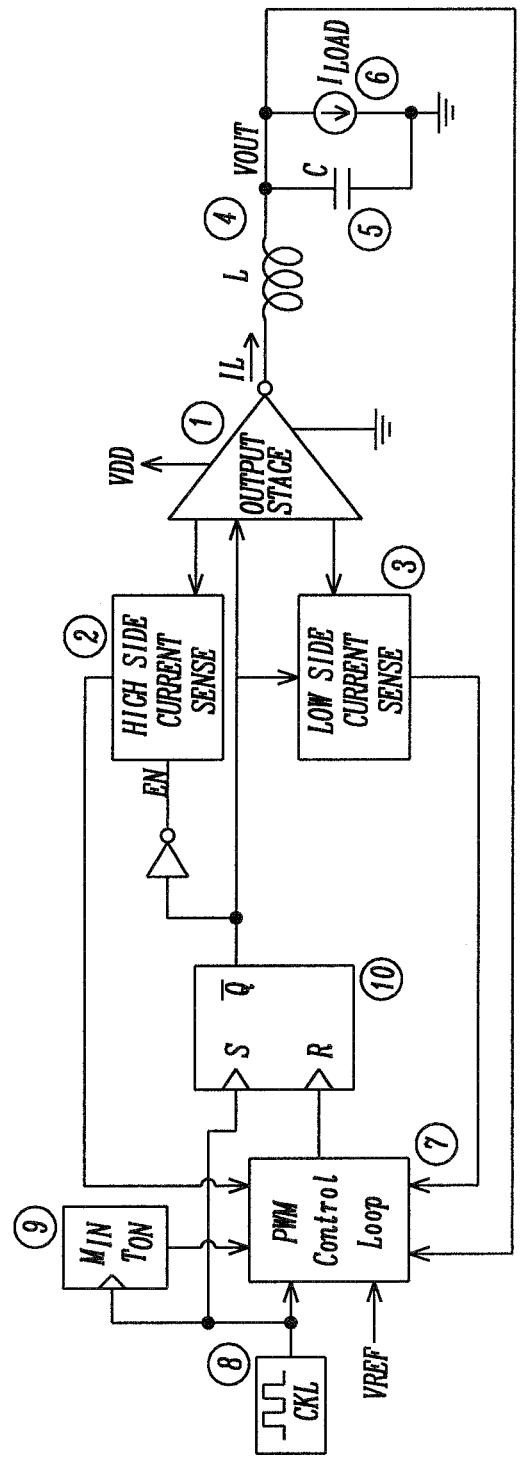
FIG. 5 shows a general Buck converter controlled with a PWM that features a Minimum Turn on Time

There are too many possible implementations of a PWM control loop and for that reason they will not be described in detail. Anyway as reference in FIG. 5 there is a general Buck converter controlled with a PWM that features a Minimum Turn on Time (minTon). The Clock 8 sets the flip flop 10 periodically while the PWM loop controls the Turn On/Off time based on the feedback coming from the actual output voltage VOUT, reference voltage VREF(ideal output voltage), HSCS 2 and LSCS 3 and minTon unit 9.The minimum Ton period is a value which may be defined in the minTon unit 9.

The blocks 4 and 5 are respectively the Buck Coil and the Buck Output Capacitance. Block 11 is a general logic inverter.

Short Circuit Behavior for an Unprotected Buck Converter in DCM/PFM

In case of a short circuit at the Buck converter output voltage, if the voltage is applied at VOUT is above the target voltage (VOUT>=VREF), the Buck converter will stay in tristate condition.

Figure 6:
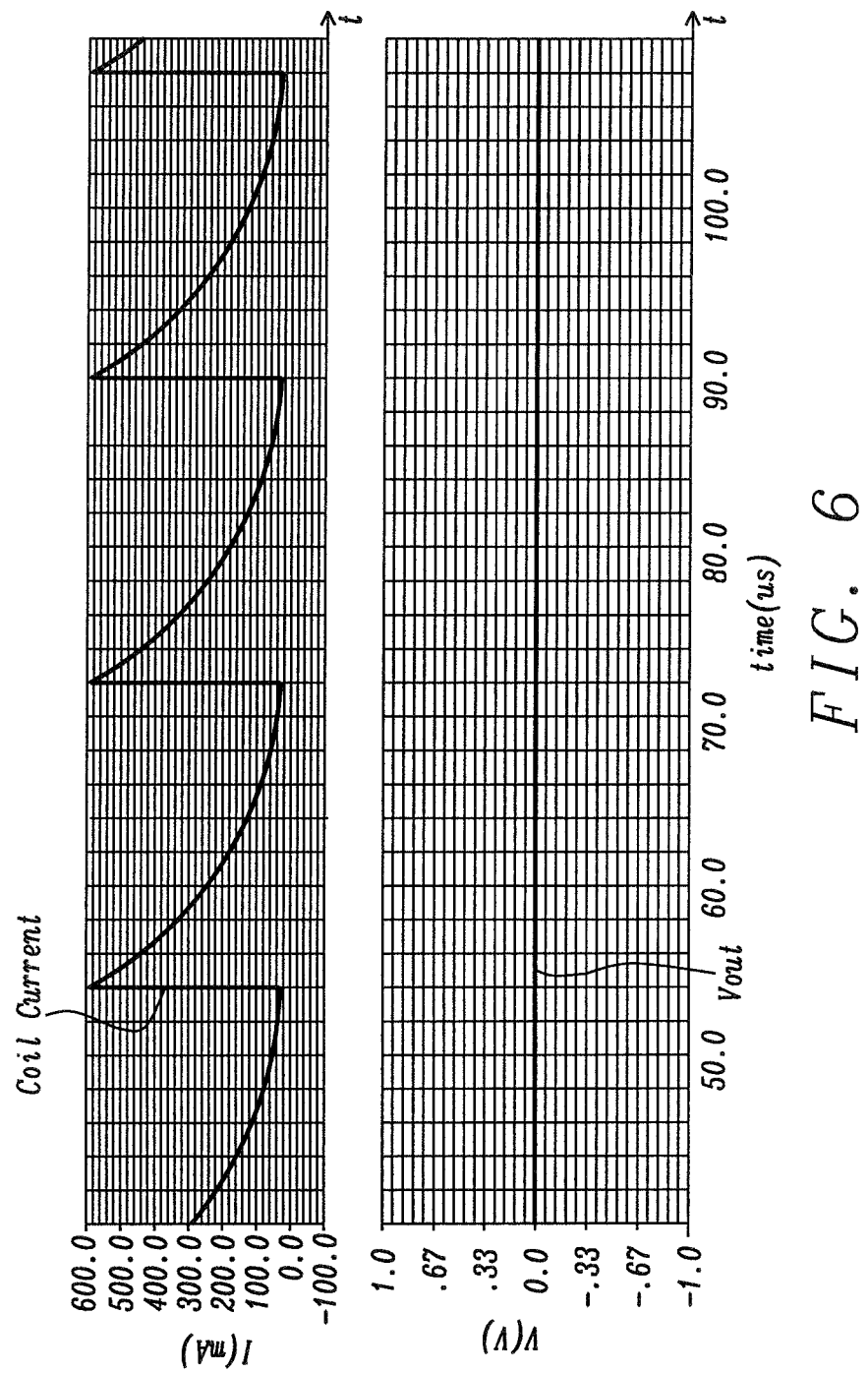
FIG. 6 shows a short circuit condition for an unprotected buck converter in DCM PFM.

FIG. 6 shows a short circuit condition for an unprotected buck converter in DCM PFM, i.e. a short to ground applied at VOUT (Forced a zero voltage between VOUT and ground VOUT=0V). If instead the short applied at VOUT is below the reference voltage VREF (VOUT<VREF) the Buck converter will try to deliver as much as current it can. Luckily in DCM PFM the maximum deliverable current even in case of a short is limited by the intrinsic control loop to at maximum half the programmed peak current.

Short Circuit Behavior for an Unprotected Buck Converter in CCM/PFM

In case of a short circuit at the Buck output voltage, if the voltage short applied at VOUT is above the target voltage (VOUT>=VREF) the Buck will stay in tristate. If instead the short applied at VOUT is below the reference voltage VREF (VOUT<VREF) the Buck will try to deliver as much as current it can. This time in CCM PFM the maximum deliverable current due to the constraints of the minToff and minTon is well above the programmed peak current.

In fact the maximum switching frequency is not only limited by the minToff time but also by minTon time that is intrinsically based on the design. In fact when the output stage high side is turned on the current comparator should start to work. In order to avoid that it trips for the initial in-rush current a blanking time must be implemented. That is the minTon time. It can happen that due to the design constraints the minTon and minToff cannot be correlated and so are selected independently. In this case there is no guarantee that the Buck will work correctly during a short. Due to those limitations the current in the coil will continue to increase until a new steady state is reached. Unfortunately this new steady state can require the coil current to exceed the maximum allowed current and eventually destroy the coil.

Figure 7:
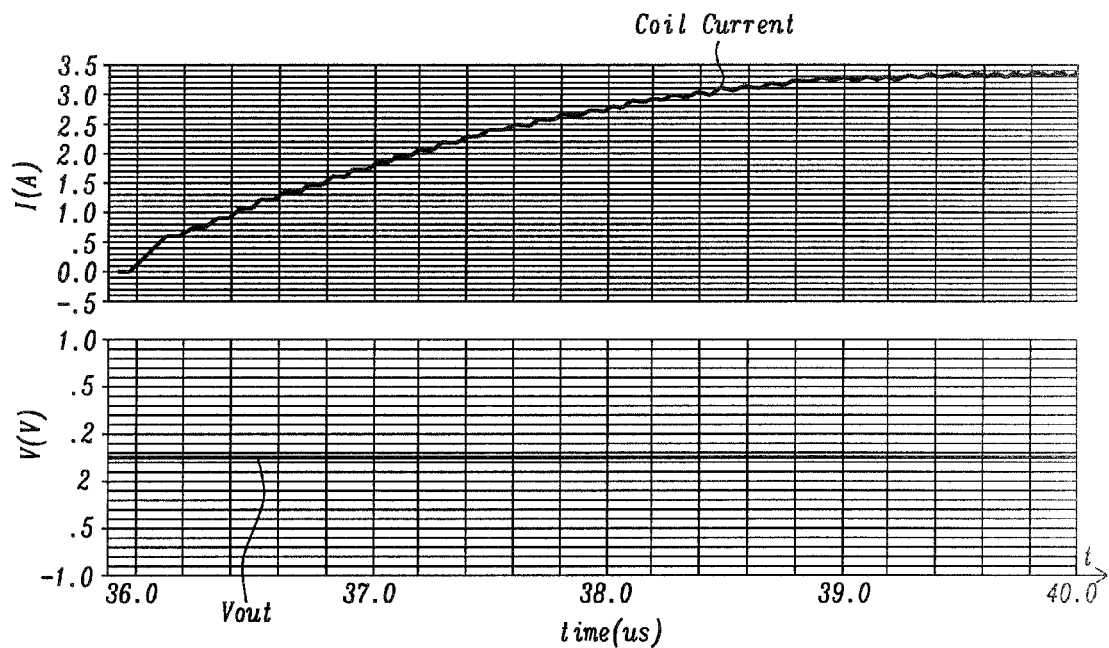
FIG. 7 shows the case of a short to ground applied at VOUT (Forced a zero voltage between VOUT and ground VOUT=0V) of a buck converter in CCM PFM.

FIG. 7 shows the case of a short to ground applied at VOUT (Forced a zero voltage between VOUT and ground; VOUT=0V).

Figure 8:
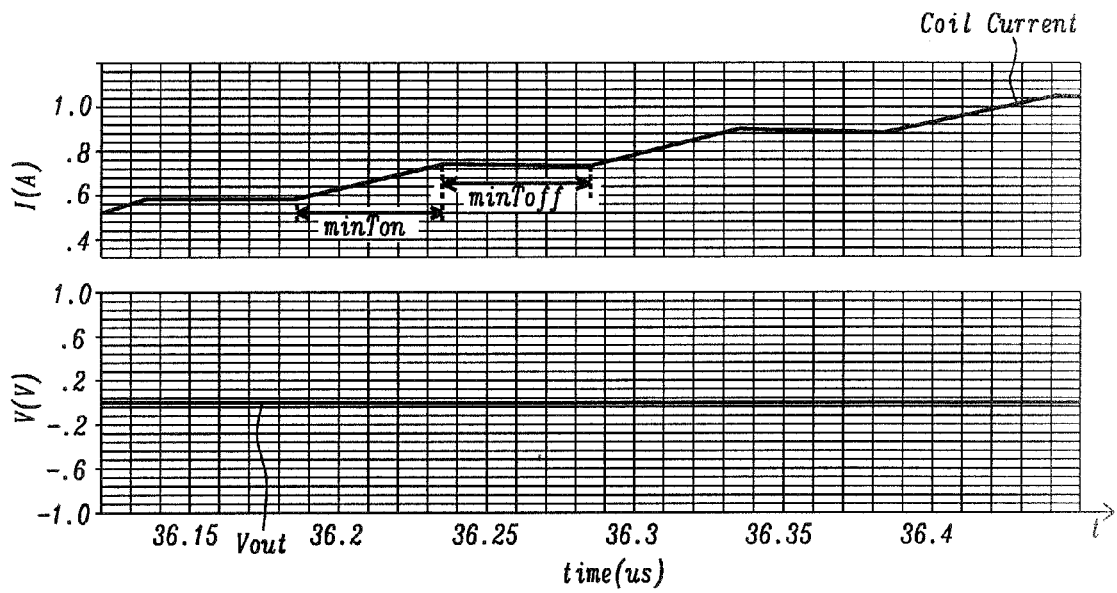
FIG. 8 shows the case of a short applied when the short is applied while VOUT is below VREF of a buck converter in CCM PFM.

FIG. 8 shows the case of a short applied when the short is applied while VOUT is below VREF. In this case the Buck converter turns on the high side. Once the programmed current limit is reached the low side is turned on, but after the period of time minToff, VOUT is still below VREF so the Buck converter has no choice to turn on again the high side at least for a minTon period even if the current in the coil is above the current limit. With a short applied the Buck converter in CCM PFM can only work with minTon and minToff and for the reason explained above the current in the coil cannot be correctly limited and eventually the coil can be destroyed.

Short Circuit Behavior for a Cycle to Cycle Current Limit Protected Buck Converter in PWM.

Figure 9:
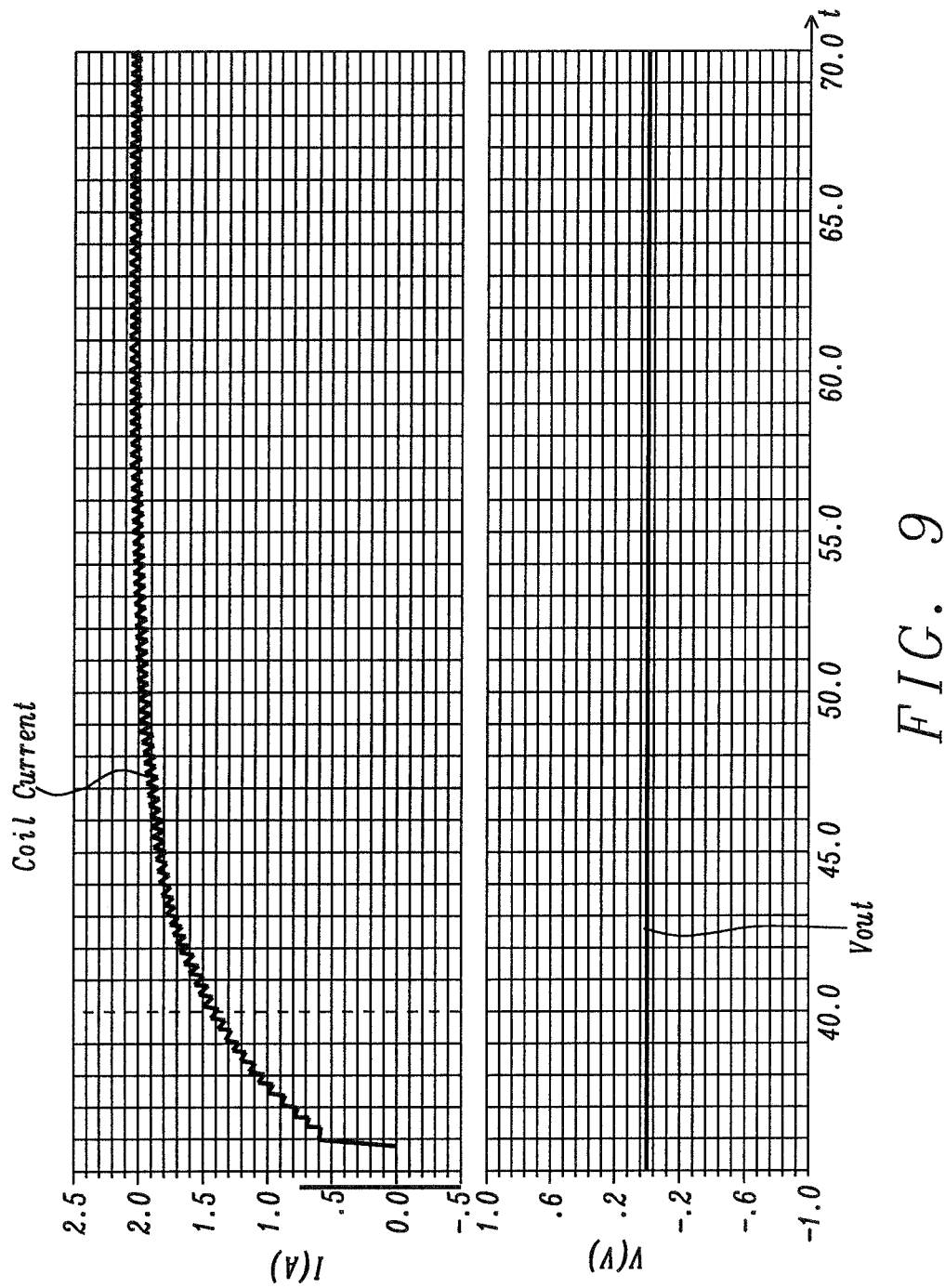
FIG. 9 shows the waveforms of the coil current and the output voltage for a buck converter shorted to ground in PWM.

FIG. 9 shows the waveforms of the coil current and the output voltage for a buck converter shorted to ground in PWM.

For simplicity reason, the case of a short circuit at the buck converter output voltage is considered when the voltage short applied at VOUT is below the target voltage (VOUT<VREF). The case of a Buck that features a positive cycle to cycle current limit and Minimum Turn On Time minTon period is also considered.

In this case, like in the case of CCM PFM although the current limit is triggered, the buck converter must stay on for at least a minTon period. Hence the coil current increases until a new steady state is reached again. Although the current limit is set around 600 mA, because of the setting of minTon the steady state can only be reached at 2 A of coil current.

Figure 16:
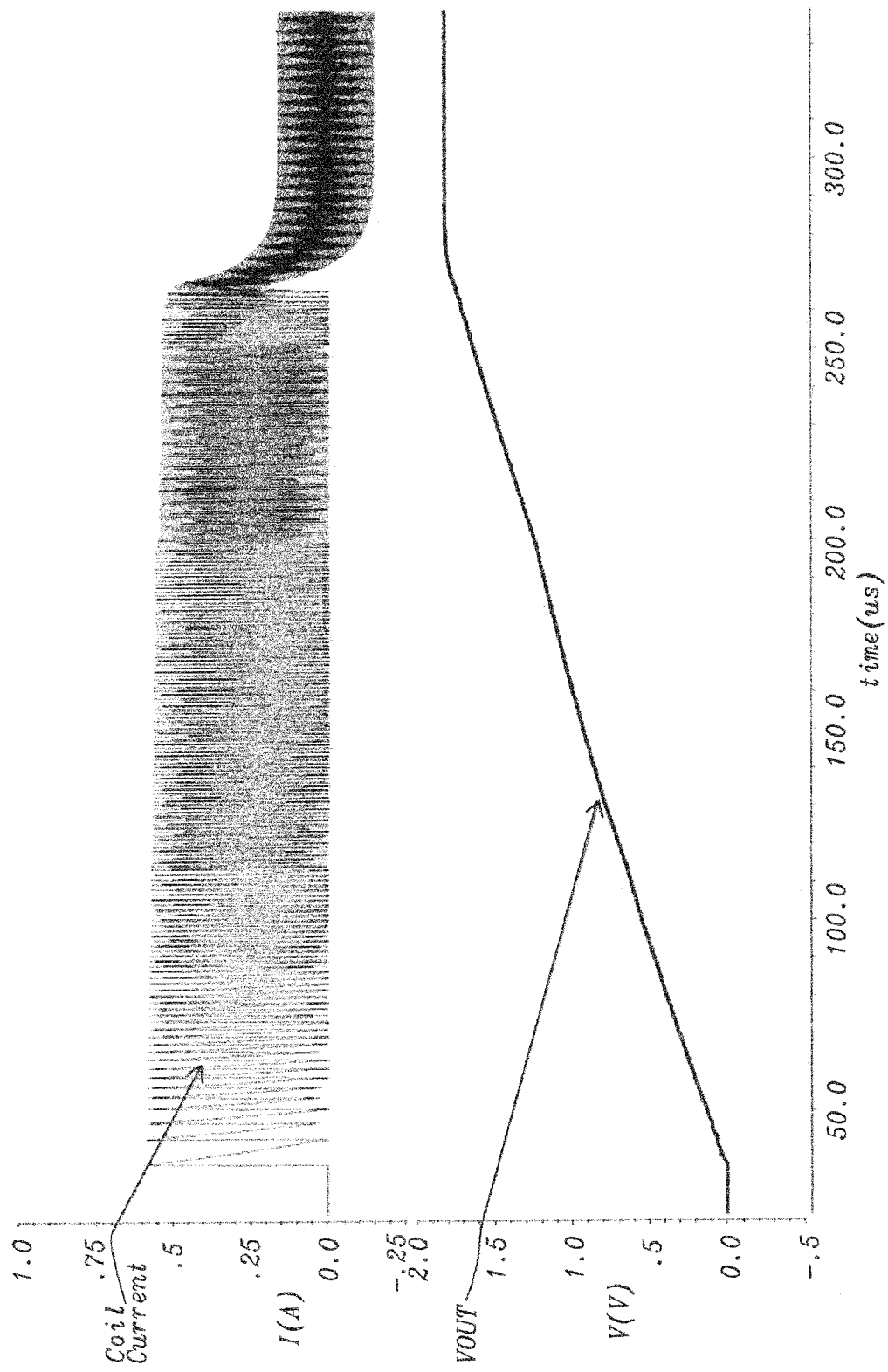
FIG. 16 shows a PWM start-up of a buck converter with high cap at the output.

Implementations of the short circuit self-protection in CCM PFM modulation mode:

New Short Circuit Self-Protection Method:

In order to limit the current in the coil in case of a Short Circuit (and also at the start up, as shown in FIG. 16) a novel method is disclosed:

The basic idea for this short circuit self- protection can be broken down in 3 steps:
1. First a circuit must detect the short/overload condition.
2. If there is a short detected the current in the coil must be limited in his peak value and once this limit is triggered, the current must be as soon as possible inverted until it is low enough (respectively high enough for negative currents) not to exceed the limit during the next forced on- time period. This can apply either to the on-time period of the high side switch or the on-time period of the low side switch (normally called $t_{off}$).
3. Once the current reaches zero or a value close to zero, the output stage must stay in Tri-state until the internal control directs the current to flow in the same direction of the current limit that has been previously triggered. At this point the normal operation can be recovered. (Anyway if the short is still detected the point 2 and 3 will be repeated).

Figure 11:
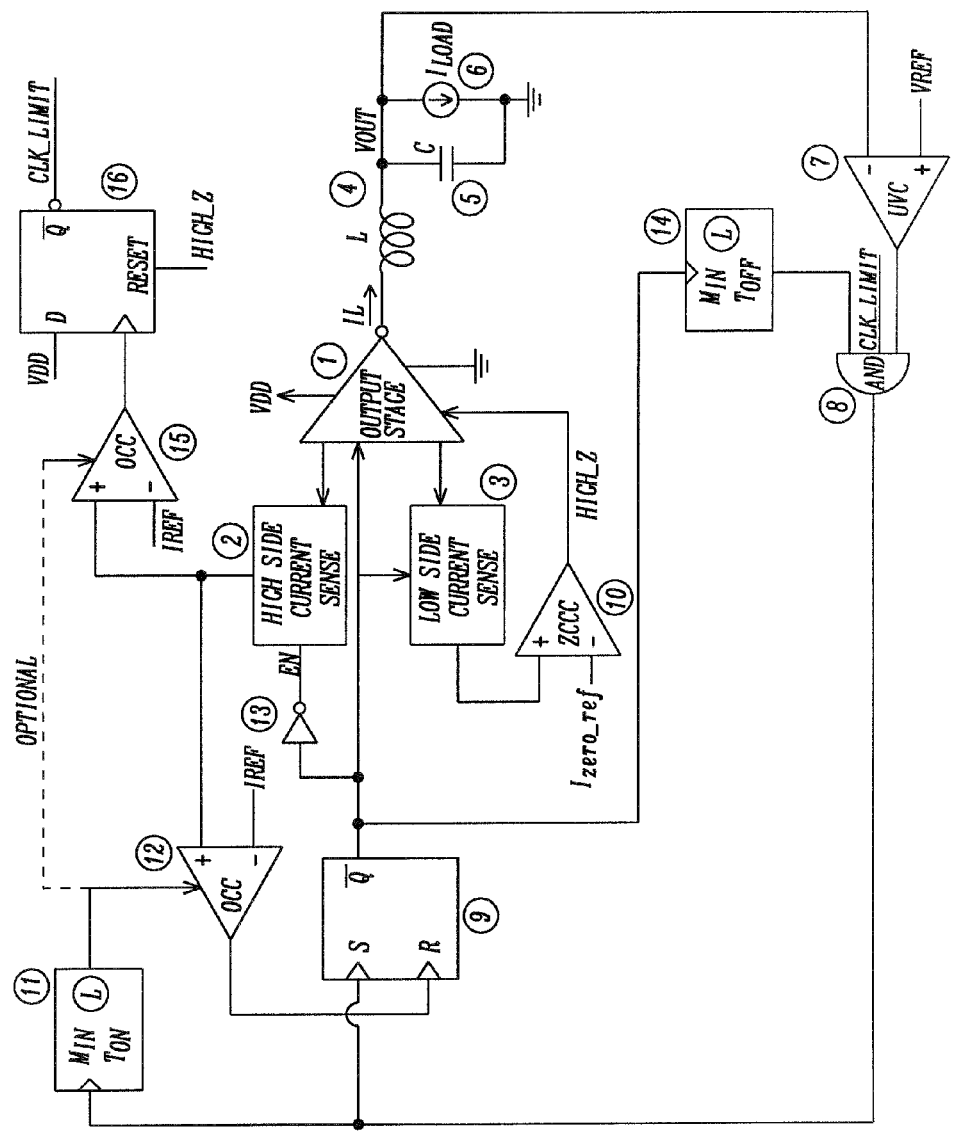
FIG. 11 illustrates a $1^{st}$ implementation of the Short Circuit Self-Protection in a CCM PFM.

Implementations of the Short Circuit Self-Protection in a CCM PFM:

In order to detect the condition of short/overload 2 possible solutions will be disclosed:
1) Use of an additional Over Current Comparator (OCC) output with the option to be in combination with the minTon period unit (Ton); ($1^{st}$ Implementation), as shown in FIG. 11.
2) Use of the minTon time unit in combination with the OCC output; ($2^{nd}$ implementation), as shown in FIG. 12.

Referring to FIG. 11, in the $1^{st}$ implementation, if there is a short that forces VOUT<VREF, detected by the Under Voltage Comparator (UVC) 7, first the high side current sense unit 2 will trigger the primary current limit comparator OCC 12 then after the first minimum turn on time of the high switch, as defined in the minTon unit 11, the second OCC 15 may be optionally triggered by the minTon unit 11 and since the buck converter is not in high-Z (tristate, HIGH_Z low) the signal CLK_LIMT is set to 0 by the flip-flop 16. At this point because of the AND gate 8 the current in the coil is forced to decrease until it reaches the low crossing value Izero_ref as input to ZCCC unit 10. The low crossing value IZERO_ref may be zero or close to zero. The moment the current in the coil reaches Izero_ref, the signal HIGH_Z is toggled high, the buck is put in High-Z and since the flip-flop 16 is reset and the signal CLK_LIMIT is 1 again, the AND 8 is no longer gated and the Buck converter can recover the normal operation. In case, the short is not removed, the short self-protection loop will be repeated.

It should be noted that minimum Toff time and minimum Ton time may be different.

Figure 12:
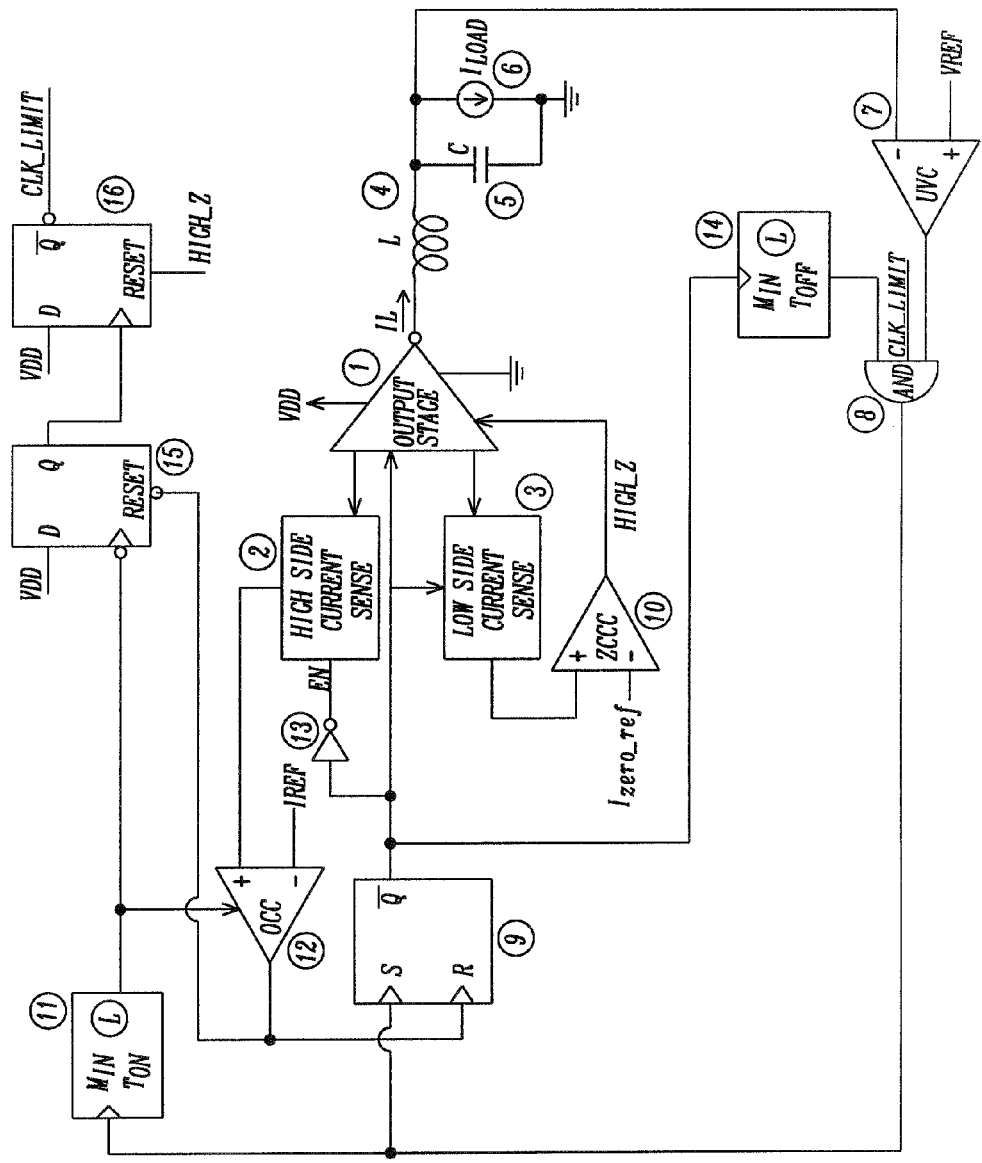
FIG. 12 illustrates a 2nd implementation of the Short Circuit Self-Protection in a CCM PFM.

In the $2^{nd}$ Implementation shown in FIG. 12, if there is a short that force VOUT<VREF, first the current will trigger the current limit comparator OCC 12 then just after the following minimum turn on time (minTon) of the high switch, since the OCC 12 will be still high and the buck is not in high-Z (tristate, HIGH_Z low) the signal CLK_LIMT is set to 0 by the flip-flops 15 and 16. At this point, because of the AND gate 8, the current in the coil is forced to decrease until it reaches the low crossing value Izero_ref. The moment it reaches Izero_ref the signal HIGH_Z is toggled high, the buck is put in High-Z and since the flip-flop 16 is reset and the signal CLK_LIMIT is 1 again, the AND gate 8 is no longer gated and the Buck can recover the normal operation. In case the short is not removed the short self-protection loop will be repeated.

Figure 10A:
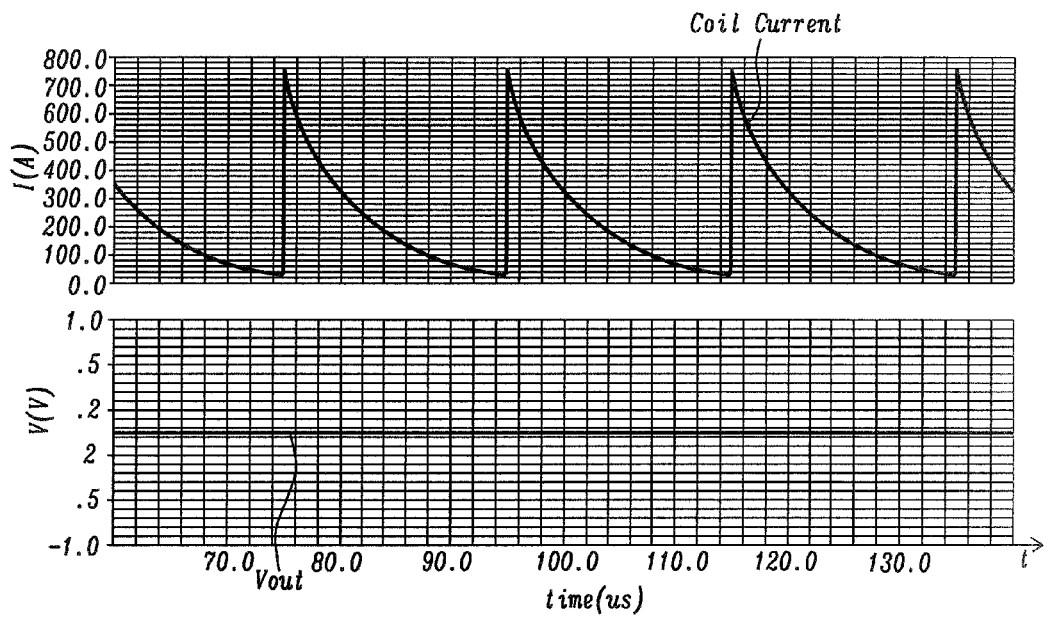
FIG. 10a shows waveforms of the coil current $I_L$ for a Buck converter in CCM with Short Circuit Protection and VOUT shorted to ground.
Figure 10B:
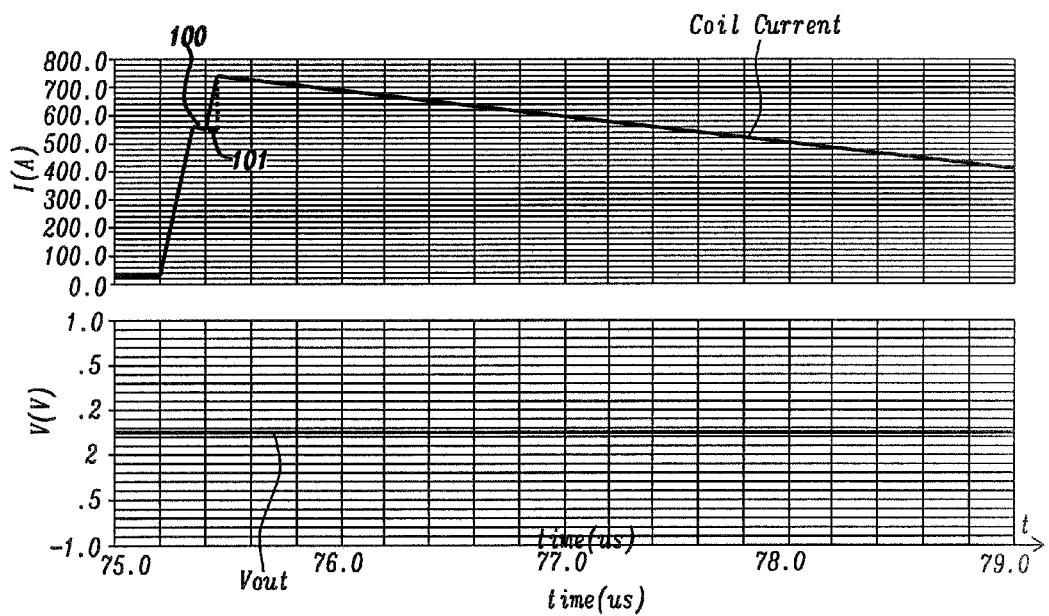

The minToff time of block 14 defines the maximum switching frequency and hence avoids the buck converter to go to 100% duty cycle FIG. 10a shows waveforms of the coil current $I_L$ for a Buck converter in CCM with Short Circuit Protection and VOUT shorted to ground and FIG. 10b illustrates the waveforms of FIG. 10a zoomed in. FIG. 10b shows the programmed current limit 100 and minimum ton period 101.

Figure 14:
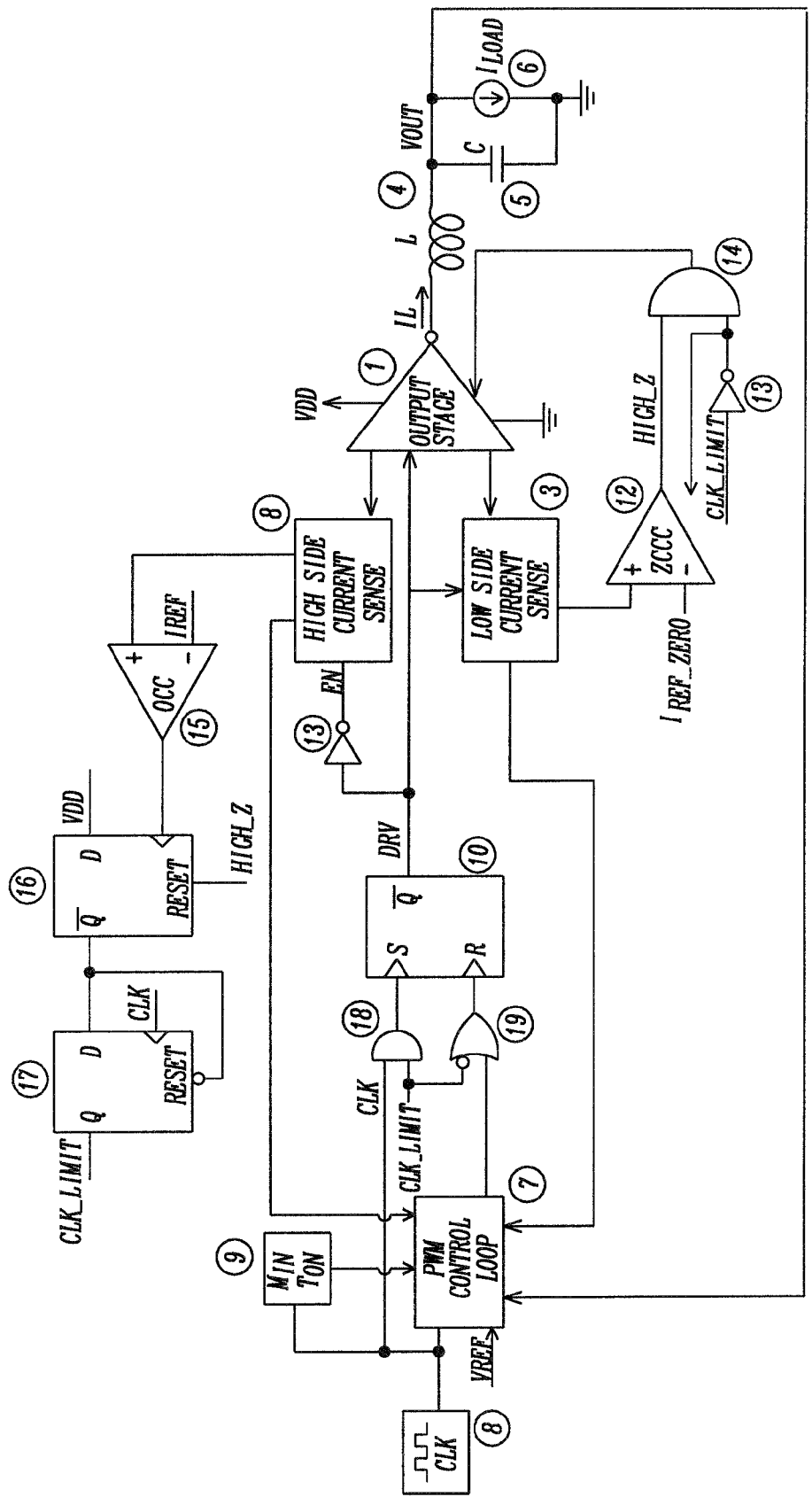
FIG. 14 shows a short protection circuit implementation in PWM for VSHORT<=VREF.
Figure 15:
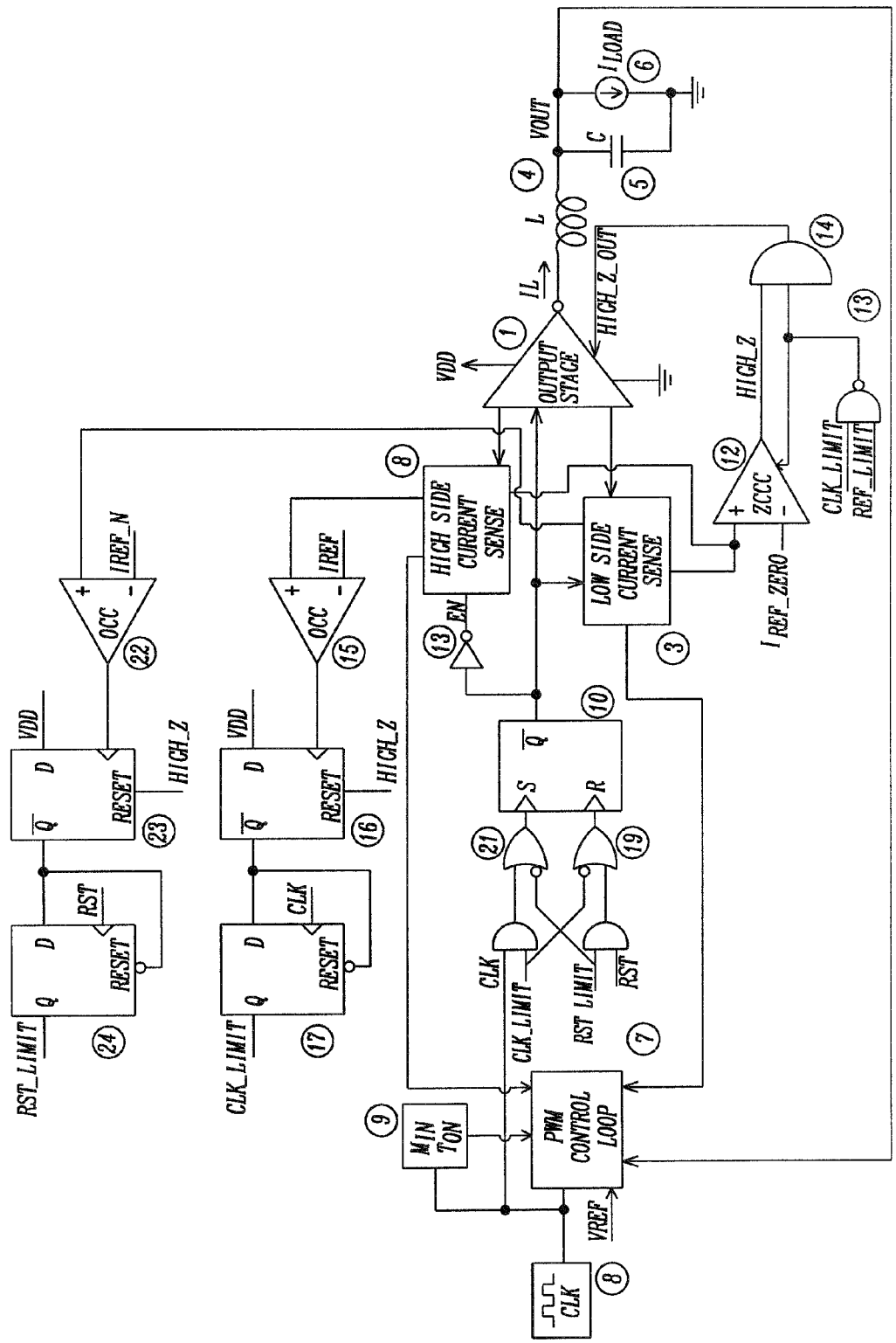
FIG. 15 shows a short protection circuit implementation in PWM for any VSHORT.

Implementations of the Short Circuit Self-Protection in PWM:

In FIGS. 14 and 15 there are 2 implementations for the Short Circuit Self-Protection in PWM.

In particular, in FIG. 14 there is the implementation for a Short Circuit protection only for VOUT>VREF. In FIG. 15 the implementation is complete to allow a Short Circuit protection for any value of a short at VOUT.

Implementations of the Short Circuit Self-Protection in PWM for VSHORT <=VREF

FIG. 14 shows a short protection circuit implementation in PWM for VSHORT<=VREF. Compared to the PWM without protection in FIG. 5 the following elements have been added in FIG. 14:

ZCCC (Current Coil Low Crossing Detector) 12 (Toggle high when the current in the coil reaches a defined value Izero_ref, it is latched once triggered and is reset low by the inverter 13 output HIGH_Z=0 if reset=0);
Inverter gate 13;
AND gate 14;
OCC (Over Current Comparator) 15;
flip-flop edge triggered D-type with positive logic reset 16;
flip-flop edge triggered D-type with negative logic reset 17;
AND gate 18; and
OR gate with one input active low 19;

In case of a short applied at VOUT that forces VOUT<VREF when the current exceeds the programmed current limit (function of IREF) the output of the OCC 15 forces the net CLK_LIMIT low.

As consequence the CLK signal is gated 18 and the Output Stage low side is enabled (reset is forced on the flip-flop 10 by the OR gate 19) . At the same time the ZCCC 12 is enabled. Once the current in the coil reaches zero (or Izero_ref) the ZCCC12 trips, the signal HIGH_Z is high and the Output Stage is forced in Tristate. Because of HIGH_Z is high, the output of the flip-flop 16 is high and on the rising edge of the next CLK the signal CLK_LIMIT is forced high, the flip-flop (10) is set and the output is no longer in Tristate because the output of AND gate 14 is forced low.

The normal PWM loop can now take over or, if the short is still applied, it will be detected again and the loop described above will be repeated.

Figure 13:
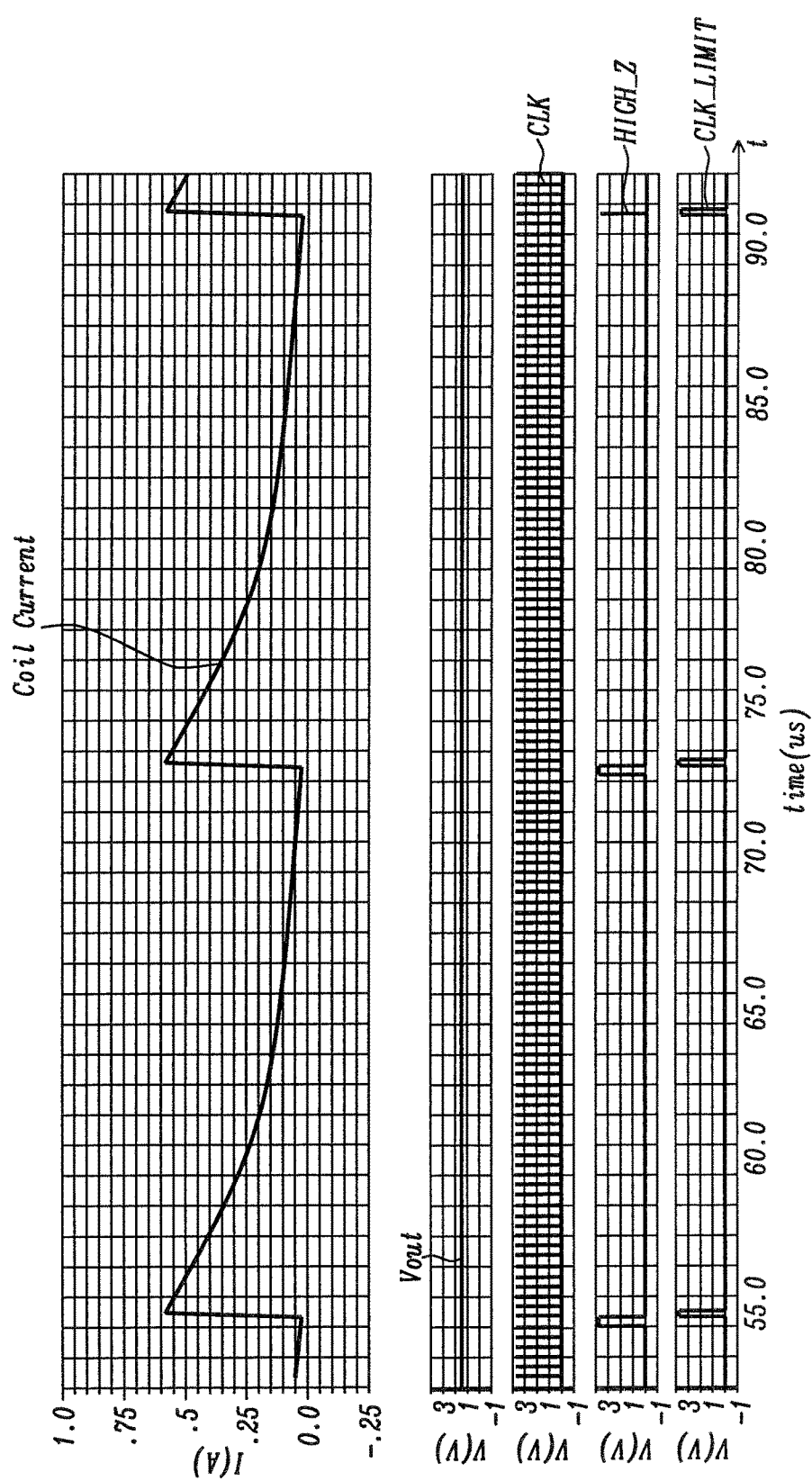
FIG. 13 shows waveforms of the coil current, Vout, CLK pulses, HIGH_Z signal, and CLK_LIMIT signal in case of a output shorted to ground VOUT=0 in a CCM PWM operation.

FIG. 13 shows waveforms of the coil current, Vout, CLK pulses, HIGH_Z signal, and CLK_LIMIT signal in case of a output shorted to ground VOUT=0 in a CCM PWM operation.

Implementation of a Full Short Circuit Self-Protection in PWM (any VSHORT).

FIG. 15 shows a short protection circuit implementation in PWM for any VSHORT. Compared to the PWM without protection in FIG. 14 the following elements have been added in FIG. 15:

(20) AND gate 20;
(21) OR gate with one input active low 21;
(22) OCC (Over Current Comparator) 22;
(23) flip-flop edge triggered D-type with positive logic reset 23; and
(24) flip-flop edge triggered D-type with negative logic reset 24.

The inverter gate 13 shown in FIG. 14 has been now changed in a NAND gate 130 in FIG. 15.

The case of a short applied at VOUT that forces VOUT<VREF has been already outlined above.

In the case of a short VOUT>VREF when the current exceeds the programmed negative current limit (function of IREF_N) the output of the OCC 22 forces the net RST_LIMIT low.

As consequence the RST signal is gated 20 and the Output Stage low side is enabled (reset is forced on the flip-flop 10 by the OR gate 21). During the output low side is enabled the high side is disabled.

At the same time the ZCCC 12 is enabled. Once the current in the coil reaches Izero_ref the ZCCC 12 trips, the signal HIGH_Z is high and the Output Stage is forced in Tristate. Because of the HIGH_Z is high, the output of the flip-flop 22 is high and on the rising edge of the next RST the signal RST_LIMIT is forced high, the flip-flop 10 is reset and the output is no longer in Tristate because the output of AND gate14 is forced low.

The normal PWM loop can now take over or, if the short is still applied, it will be detected again and the loop described above will be repeated. In this case the ZCCC 12 has to be capable to detect the coil current crossing in the high-side switch as well as in the low side switch.

It has to be noted that the short circuit self-protection implementation disclosed in the document is also an intrinsic soft start-up implementation. All implementations disclosed above work also an intrinsic start-up circuitry. FIG. 16 shows a PWM start-up of a buck converter with high cap at the output.

Furthermore it has to be noted that a short to GROUND in a buck converter is similar to a short at the output of a boost converter to a supply voltage of a boost converter. Therefore the methods disclosed above for buck converters can also be applied to boost converters.

Figure 17:
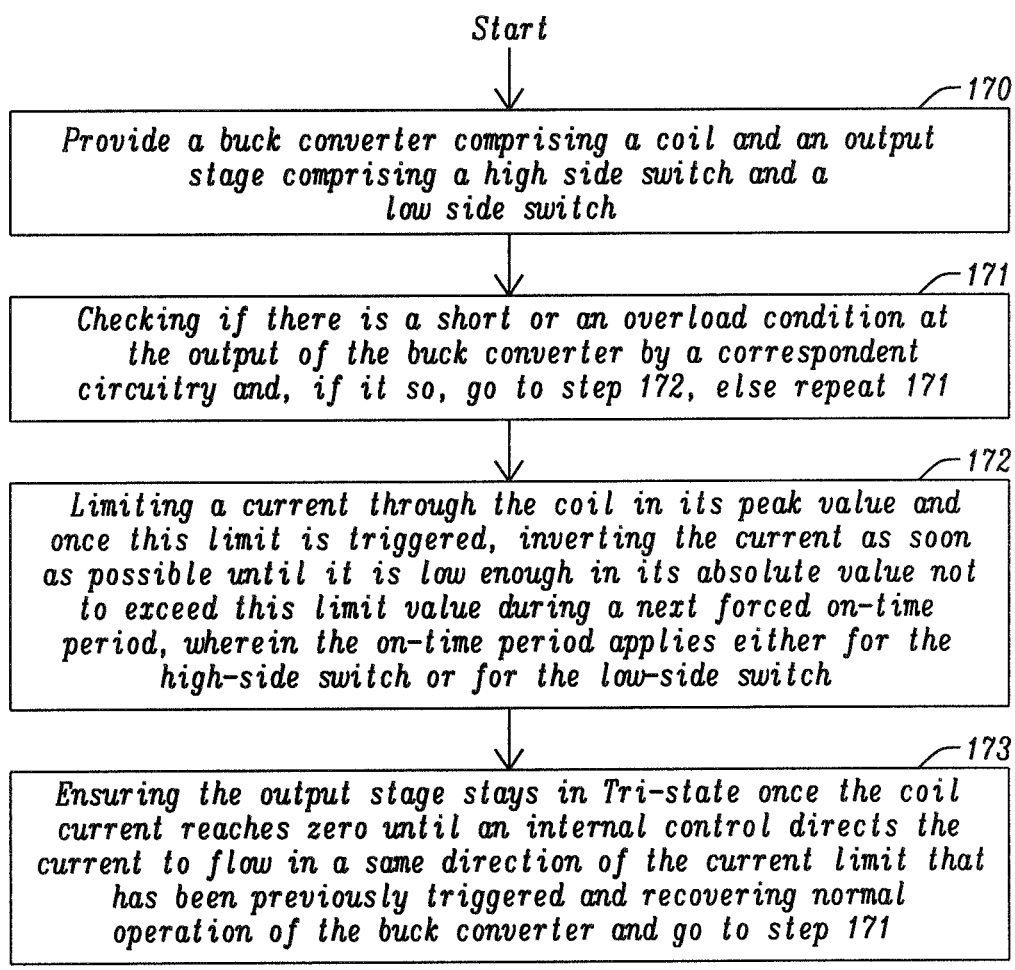
FIG. 17 depicts a flowchart of a method for self-protection of a buck converter against short circuit at the output of the buck converter and for an intrinsic soft start-up preventing excessive in-rush currents.

FIG. 17 shows a flowchart of a method for self-protection of a buck converter against short circuit at the output of the buck converter and for an intrinsic soft start-up preventing excessive in-rush currents. A first step 170 depicts provision of a buck converter comprising a coil and an output stage comprising a high side switch and a low side switch. The next step 171 shows checking if there is a short or an overload condition at the output of the buck converter by a correspondent circuitry and, if it so, go to step 172, else repeat step 171. Step 172 describes limiting a current through the coil in its peak value and once this limit is triggered, inverting the current as soon as possible until it is low enough in its absolute value not to exceed this limit value during a next forced on-time period, wherein the on-time period applies either for the high-side switch or for the low-side and the last step 173 illustrates ensuring the output stage stays in Tri-state once the coil current reaches zero until an internal control directs the current to flow in a same direction of the current limit that has been previously triggered and recovering normal operation of the buck converter and go back to step 171.

While the disclosure has been particularly shown and described with reference to the preferred embodiments thereof, it will be understood by those skilled in the art that various changes in form and details may be made without departing from the spirit and scope of the disclosure.

What is claimed is:

1. A buck converter configured to operate in Continuous Conduction Modulation (CCM) Pulse Frequency Modulation (PFM), enabled for self-protection of the buck converter against short circuit or overload at the output of the buck converter by a self-protection loop, for managing a recovery from the short or overload condition of the buck converter and for an intrinsic soft start-up preventing excessive in-rush currents, comprising:
   an output stage comprising a high side switch and a low side switch both connected in series, wherein the output stage is configured to connected to a coil having a first terminal at a node between the high side switch and the low side switch;
   a high-side current sense circuit, configured to sense a current through the high side switch;
   a first overcurrent comparator configured to compare an output signal of the high-side current sense circuit with a reference current, wherein, in case of a short or an overload, an output signal of the first overcurrent comparator is enabled to control the high side switch, wherein the first overcurrent comparator is coupled to a minTon unit;
   said minTon unit configured to define a minimum on-time of the high switch, wherein the minTon unit receives input from an AND logical gate;
   a second overcurrent comparator configured to compare the output signal of the high-side current sense circuit with the reference current, wherein, in case of a short or an overload, an output signal of the first overcurrent comparator is triggered and initiates a signal CLK Limit to be set to low, wherein the CLK Limit signal is a second input of said AND logical gate, while the buck converter is set from a high impedance mode to a low impedance mode;
   a minToff time unit configured to limit a maximum switching frequency of the buck converter, wherein the minToff time unit is coupled to an input of the output stage of the buck converter and to a first input of said logical AND gate;
   said logical AND gate having inputs and an output, wherein a second input is the CLK Limit signal and a third input is an output of said voltage comparator, wherein the output of the logical AND gate is coupled to the output stage of the buck converter, wherein, in case of a short, a current in the coil is forced to decrease until it reaches a low crossing value Izero ref and at the moment the current through the coil reaches Izero ref, the signal CLK Limit is set high via the second overcurrent comparator, the buck converter is set in the high impedance mode again, the logical AND gate is no longer gated and the buck converter is enabled to recover normal operation and, if the short is not removed, the short self-protection loop is repeated;
   said voltage comparator configured to compare an output voltage (Vout) of the buck converter with a reference voltage; and
   a current coil low crossing detector configured to detect when the current through the coil reaches said defined low crossing value Izero ref.

2. The buck converter of claim 1, wherein the second comparator is configured to compare the result of the high side current sensing with the reference current is triggered by the minTon unit.

3. The buck converter of claim 2, wherein a flip-flop, initiated by the second comparator, sets the signal CLK_LIMIT to low if a short has been detected and the buck converter is in low impedance mode and the flip-flop sets the signal CLK_Limit, initiated by the second comparator, to high at the moment the coil current reaches the low crossing value and the buck converter is in high impedance mode.

4. The buck converter of claim 1, wherein the buck converter is set, in case of a short, in a low impedance mode by a current sensing device flowing through the low side switch and a comparator configured to comparing the result of the low side current sensing with a reference current representing the low crossing current value, wherein the output of the comparator is connected to the output stage and sets the impedance mode of the buck converter, wherein the comparator sets the impedance mode to high when the low side current sensed is equal to the low crossing value.

5. The buck converter of claim 4 wherein the reference current representing the low crossing current value has a value of zero or close to zero.

6. A buck converter configured to operate in Continuous Conduction Modulation (CCM) Pulse Frequency Modulation (PFM), enabled for self-protection of the buck converter against short circuit or overload at the output of the buck converter by a self-protection loop, for managing a recovery from the short or overload condition of the buck converter and for an intrinsic soft start-up preventing excessive in-rush currents, comprising:
   an output stage comprising a high side switch and a low side switch both connected in series, wherein the output stage is configured to being connected to a coil having a first terminal at a node between the high side switch and the low side switch;
   a high-side current sense circuit, configured to sense a current through the high side switch;
   an overcurrent comparator configured to compare an output signal of the high-side current sense circuit with a reference current, wherein, in case of a short or an overload, an output signal of the overcurrent comparator is enabled to control the high side switch, wherein the overcurrent comparator is coupled to a minion unit;
   said minTon unit configured to define a minimum on-time of the high switch, wherein the minion unit receives input from an AND logical gate;
   a circuitry configured to trigger a signal in case of a short or an overload condition coupled to the minTon unit, wherein, if a short is detected by a voltage comparator, an output signal CLK_Limit of the circuitry configured to trigger a signal is set to low, wherein the CLK_Limit signal is a second input of said AND logical gate, while the buck converter is set from a high impedance mode to a low impedance mode;
   a minToff time unit configured to limit a maximum switching frequency of the buck converter, wherein the minToff unit is coupled to an input of the output stage of the buck converter and to a first input of said logical AND gate;
   said logical AND gate having inputs and an output, wherein a second input is the CLK_Limit signal and a third input is an output of said voltage comparator, wherein the output of the logical AND gate is coupled to the output stage of the buck converter, wherein, in case of a short, a current in the coil is forced to decrease until it reaches a low crossing value Izero ref and at the moment the current through the coil reaches Izero ref while the buck converter is set in a high impedance mode again, the logical AND gate is no longer gated and the buck converter is enabled to recover normal operation and, if the short is not removed, the short self-protection loop is repeated;

said voltage comparator configured to compare an output voltage (Vout) of the buck converter with a reference voltage; and a current coil low crossing detector configured to detecting when the current through the coil reaches said defined low crossing value Izero; and wherein, if the circuitry configured to detect a short circuit or an overload condition of the buck converter signals a short, two flip-flops are triggered after a defined minimum turn-off time of the high switch and then a signal CLK_Limit is set to low, while the buck converter is set in a low impedance mode and at the same time the current through the coil is forced to decrease until it reaches the low crossing value and at the moment the current reaches the low crossing value the buck converter is set to high impedance mode again, the signal CLK_limit is set high and the buck converter can recover normal operation and, if the short is not removed, the short self-protection loop is repeated.

7. The buck converter of claim 6, wherein the circuitry configured to trigger a signal in case of a short or an overload condition comprises a first flip-flop and a second flip-flop, wherein the first flip-flop receives a signal indicating a short condition from said overcurrent comparator and triggers the second flip-flop to setting the signal CLK_Limit to low if a short has been detected and the second flip-flop sets the signal CLK_Limit to high at the moment the coil current reaches the low crossing value and the buck converter is in high impedance mode.

8. The buck converter of claim 6, wherein the buck converter is set, in case of a short, in a low impedance mode by current sensing device sensing the current flowing through the low side switch and a comparator configured to comparing the result of the low side current sensing with a reference current representing the low crossing value, wherein the output of the comparator is connected to the output stage and sets the impedance mode of the buck converter, wherein the comparator sets the impedance mode to high when the low side current sensed is equal to the low crossing value.

9. A buck converter, configured to operate in Pulse Width Modulation (PWM), enabled for self-protection of the buck converter against short circuit or overload at the output of the buck converter by a self-protection loop, for managing a recovery from the short or overload condition of the buck converter and for an intrinsic soft start-up preventing excessive in-rush currents, comprising:

an output stage comprising a high side switch and a low side switch both connected in series, wherein the output stage is configured to being connected to a coil having a first terminal at a node between the high side switch and the low side switch;

a high-side current sense circuit, configured to sense a current through the high side switch, wherein a first output of the high side current sense circuit is a first input to a PWM control unit and a second output of the high side current sense circuit is an input to a first overcurrent comparator;

said first overcurrent comparator configured to compare the output signal of the high-side current sense circuit with a reference current, wherein, in case of a short or an overload, an output signal of the first overcurrent comparator forces an output signal CLK_Limit of a first latch circuitry low and the output stage is set from a high impedance mode to a low impedance mode;

said first latch circuitry, wherein upon the output signal CLK_Limit is low, the low side switch is enabled and at the same time a coil current low crossing detector is enabled and once a current in the coil reaches a low crossing value Izero the current coil low crossing detector trips, the output stage is set to a Tristate mode, an edge of a next clock pulse forces the CLK_Limit signal high, the output stage is no more in tristate mode and a normal PWM loop can now take over or, if the short is still applied it will be detected again and the self-protection loop will be repeated;

said coil current low crossing detector configured to detect when the current through the coil reaches said defined low crossing value Izero;

a low side current sense circuit, configured to sense a current through the low side switch coupled to the coil current low crossing detector, to a second overcurrent comparator and providing a second input to the PWM control unit;

said PMW control unit, configured to control a PWM control loop of the buck converter, receiving input from a system clock, a minTon unit configured to define a minimum on-time of the high switch, from the output voltage of the buck converter, from the high side current sense unit and from the low side current sense unit;

said second overcurrent comparator configured to compare the output signal of the low-side current sense circuit with a reference current IREF N, wherein, in case of a short or an overload, when a current through the low side switch exceeds a negative current limit Iref N, an output signal of the second overcurrent comparator forces an output signal RST_Limit of a second latch circuitry low;

said second latch circuitry, wherein upon the output signal RST_Limit is low, the low side output stage is enabled and at the same time the coil current low crossing detector is enabled and once a current in the coil reaches a low crossing value Izero the current coil low crossing detector trips, the output stage is set to a Tristate mode, an edge of a next RST pulse forces the RST_Limit signal high, the output stage is no more in Tristate mode, the output stage is set to high impedance mode again and a normal PWM loop can now take over or, if the short is still applied, it will be detected again and the self-protection loop will be repeated.

10. A method for self-protection of a buck converter against short circuit at the output of the buck converter and for an intrinsic soft start-up preventing excessive in-rush currents, comprising the steps of:

(1) providing a buck converter comprising a coil and an output stage comprising a high side switch and a low side switch;

(2) checking if there is a short or an overload condition at the output of the buck converter by detecting an overcurrent of the high-side switch and additionally by detecting if an output voltage of the buck converter is lower than a reference voltage as well and, if it so, go to step (3), else repeat step (2); and (3) ensuring the output stage stays in Tri-state once a coil current reaches zero until the coil current is directed to flow in a same direction of a current limit that has been previously triggered and recovering normal operation of the buck converter in a previous modulation mode and go back to step (2).

11. The method of claim 10 wherein the method is applicable for PFM and PWM modulation.

12. The method of claim 10 wherein the method is also applicable to boost converters against shorts between a boosted voltage and supply voltage.

* * * * *